(12) United States Patent
Petsev et al.

(10) Patent No.: US 8,911,864 B1
(45) Date of Patent: Dec. 16, 2014

(54) MONODISPERSED PARTICLES FABRICATED BY MICROFLUIDIC DEVICE

(75) Inventors: Dimiter N Petsev, Albuquerque, NM (US); Amber Ortiz, Corrales, NM (US); Nick Carroll, Albuquerque, NM (US); Plamen Atanassov, Santa Fe, NM (US); Svitlana Pylypenko, Arvada, CO (US)

(73) Assignee: STC.UNM, Albuquerqeu, NM (US)

( * ) Notice: Subject to any disclaimer, the term of this patent is extended or adjusted under 35 U.S.C. 154(b) by 474 days.

(21) Appl. No.: 13/161,302

(22) Filed: Jun. 15, 2011

Related U.S. Application Data

(60) Provisional application No. 61/397,668, filed on Jun. 15, 2010.

(51) Int. Cl.
*B32B 5/16* (2006.01)

(52) U.S. Cl.
USPC ........... 428/402; 428/403; 427/212; 427/214; 427/215; 427/213.3; 427/213.31

(58) Field of Classification Search
USPC .................. 428/402, 403; 427/212, 214, 215, 427/213.3, 213.31
See application file for complete search history.

(56) References Cited

U.S. PATENT DOCUMENTS 8,334,013 B2 * 12/2012 Petsev et al. ................... 427/212
8,334,014 B1 * 12/2012 Petsev et al. ................... 427/212

* cited by examiner

*Primary Examiner* — Leszek Kiliman
(74) *Attorney, Agent, or Firm* — Gonzales Patent Servies; Ellen M. Gonzales

(57) ABSTRACT

According to various embodiments the present disclosure provides porous particles and methods and apparatus for forming porous microparticles. According to a specific embodiment, the present disclosure provides microparticles with multi-nodal porosity and methods for forming the same. According to a still further embodiment, the present disclosure provides microfluidic device-based methods for forming microparticles with multi-nodal nanoporosity. Furthermore, the present disclosure provides populations of monodisperse mesoporous microparticles with multi-nodal nanoporosity and methods and apparatus for forming the same. According to a specific embodiment, the present disclosure provides populations of monodisperse mesoporous microparticles formed using a microfluidic device.

13 Claims, 11 Drawing Sheets

MONODISPERSED PARTICLES FABRICATED BY MICROFLUIDIC DEVICE

CROSS-REFERENCE TO RELATED APPLICATIONS

The following application claims benefit of U.S. Provisional Application No. 61/397,668, filed Jun. 15, 2010, which is hereby incorporated by reference in its entirety.

STATEMENT REGARDING GOVERNMENT SPONSORED RESEARCH

This invention was made with Government support under grant nos. CBET-0828900 and DMR-0611616 awarded by the National Science foundation. The U.S. Government has certain rights in this invention.

BACKGROUND

Emulsification of a polymer precursor followed by execution of the polymer chemistry within emulsion droplet reactors provides a facile and versatile method for producing microparticles. Not surprisingly, if a liquid-to-solid chemical reaction proceeds to completion within these drops, the resultant solid particles will possess the shape of the droplets. See, e.g., Nie, Z. H., et al., Polymer particles with various shapes and morphologies produced in continuous microfluidic reactors. Journal of the American Chemical Society, 2005. 127(22): p. 8058-8063 and Dendukuri, D., et al., Controlled synthesis of nonspherical microparticles using microfluidics. Langmuir, 2005. 21(6): p. 2113-2116. Microfluidic flow-focusing devices (MFFDs) provide a straightforward and robust approach to the formation of highly monodisperse emulsion drops. See, e.g., Anna, S. L., N. Bontoux, and H. A. Stone, Formation of dispersions using "flow focusing" in microchannels. Applied Physics Letters, 2003. 82(3): p. 364-366. It has been demonstrated that microfluidic-generated drops can function as both morphological templates and chemical reactors for the synthesis of monodisperse polymer and biopolymer particles. See, e.g., Xu, S., et al., Generation of monodisperse particles by using microfluidics: Control over size, shape, and composition (vol 44, pg 724, 2005); Angewandte Chemie-International Edition, 2005. 44(25): p. 3799-3799; 5. Ikkai, F., et al., New method of producing mono-sized polymer gel particles using microchannel emulsification and UV irradiation. Colloid and Polymer Science, 2005. 283(10): p. 1149-1153; Serra, C., et al., A predictive approach of the influence of the operating parameters on the size of polymer particles synthesized in a simplified microfluidic system. Langmuir, 2007. 23(14): p. 7745-7750; and Zhang, H., et al., Microfluidic production of biopolymer microcapsules with controlled morphology. Journal of the American Chemical Society, 2006. 128(37): p. 12205-12210.

An appealing feature to engineer into emulsion-polymerized particles is porosity. Particles with well-defined pore morphology are essential for many areas of modern technology. Potential applications include catalysis and electrocatalysis, chromatography, and drug delivery. See e. g., Cejka, J. and S. Mintova, Perspectives of micro/mesoporous composites in catalysis. Catalysis Reviews-Science and Engineering, 2007. 49(4): p. 457-509; Hartmann, M., Ordered mesoporous materials for bioadsorption and biocatalysis. Chemistry of Materials, 2005. 17(18): p. 4577-4593; Gasteiger, H. A., et al., Activity benchmarks and requirements for Pt, Pt-alloy, and non-Pt oxygen reduction catalysts for PEMFCs. Applied Catalysis B-Environmental, 2005. 56(1-2): p. 9-35; Gallis, K. W., et al., The use of mesoporous silica in liquid chromatography. Advanced Materials, 1999. 11(17): p. 1452-1455; and Vallet-Regi, M., et al., A new property of MCM-41: Drug delivery system. Chemistry of Materials, 2001. 13(2): p. 308-311. Precise control over the pore size and shape is crucial for the successful performance of the particles. It allows for optimization of fluid transport in a catalyst, determines the molecular release of solute by a drug delivery vehicle, or defines the size selectivity in chromatography. Templating of oxide materials with surfactant micelles is a powerful method to obtain mesoporous structures with controlled morphology. See e.g., Kresge, C. T., et al., Ordered Mesoporous Molecular-Sieves Synthesized by a Liquid-Crystal Template Mechanism. Nature, 1992. 359(6397): p. 710-712. Oxide (e.g., silica) precursor solution (sol) is mixed with a templating surfactant, and evaporation of the solvent leads to an increase in the surfactant concentration. The surfactant forms supramolecular structures according to the solution phase diagram. This is known as evaporative induced self-assembly (EISA) and has been used to obtain bulk porous materials or microparticles using high temperature aerosol methods. See e.g., Lu, Y. F., et al., Aerosol-assisted self-assembly of mesostructured spherical nanoparticles. Nature, 1999. 398(6724): p. 223-226; Brinker, C. J., et al., Evaporation-induced self-assembly: Nanostructures made easy. Advanced Materials, 1999. 11(7): p. 579-585; and Bore, M. T., et al., Hexagonal mesostructure in powders produced by evaporation-induced self-assembly of aerosols from aqueous tetraethoxysilane solutions. Langmuir, 2003. 19(2): p. 256-264; Alternatively, mesoporous particle synthesis via EISA can be performed in water in oil emulsion droplets under milder temperature stresses. Recently, Andersson et al. demonstrated the synthesis of spherical mesoporous silica particles using an approach that combines previously established emulsion-based precipitation methods with the EISA method. See, e.g., Andersson, N., et al., Combined emulsion and solvent evaporation (ESE) synthesis route to well-ordered mesoporous materials. Langmuir, 2007. 23(3): p. 1459-1464; Schacht, S., et al., Oil-water interface templating of mesoporous macroscale structures. Science, 1996. 273(5276): p. 768-771; and Huo, Q. S., et al., Preparation of hard mesoporous silica spheres. Chemistry of Materials, 1997. 9(1): p. 14-17. This synthesis route, referred to as the emulsion and solvent evaporation method (ESE), produced well-ordered 2D hexagonal mesoporous silica microspheres. The advantages of this method are control of synthesis parameters such as emulsion droplet size, temperature, evaporation speeds, humidity, and the composition of the surfactant solution. In comparison to aerosol methods, the relatively slower evaporation rate of the solvent from the emulsion droplets allows a high-degree of homogeneity of the components in the liquid crystalline phase prior to fossilization of the structures by silica condensation. This is perhaps the most important distinction of the emulsion EISA method from aerosol-based EISA methods.

Surfactant self-assembly provides a powerful method for synthesizing mesoporous materials. However, these materials are limited to micelle-templated pores with diameters of a few nanometers, and mesoporous microparticles synthesized by aerosol and ESE methods enclose internal structures rendered inaccessible at the surface due to inherent formation of a solid material layer at the surface. See, e.g., Bore, M. T., et al., and Andersson, N., et al., cited above. To address the requirements of emerging technologies, the next generation of porous oxide materials must be highly structured and functionalized. Hierarchically porous structures offer advantages in design of materials where catalytic activity is to be utilized in immediate conjunction with transport of reactants. Templating approaches for hierarchical material fabrication are attractive, as they can be combined with other methods such as impregnation or precipitation to yield structures with controlled porosity, surface chemistry, and hydrophilicity or hydrophobicity. Interfacial phenomena such as spontaneous formation of complex microemulsion phases present exceptional and generally less-explored avenues for particle nanostructure templating. See e.g., Hu, Y. and J. M. Prausnitz, Molecular Thermodynamics of Partially-Ordered Fluids—Microemulsions. Aiche Journal, 1988. 34(5): p. 814-824 and Nagarajan, R. and E. Ruckenstein, Molecular theory of microemulsions. Langmuir, 2000. 16(16): p. 6400-6415.

Furthermore, developing pathways for fabrication of monodisperse oxide particles with hierarchical internal nanoporous structure provides additional opportunities and level of complexity of material structural design. Same-size spherical microparticles are essential for developing novel families of functional digital inks for printing catalysts, current collectors, and creating polymer/oxide composites at the microscale. Such inks are essential for miniaturization of devices for catalysis, sensing and detection, and microfuel cells. Manipulating the particle structure, pore morphology and surface chemistry allows for better control at the micro and nanoscale. Monodisperse spherical microparticles can be ordered in 2D and 3D arrays to create structures with hierarchical porosity. Such structures will exhibit a variety of characteristic pore dimensions: (i) nanoscale pores that are due to micelle (single nanometer) and microemulsion (tens of nanometers) templating and (ii) microscale pores determined by the voids between monodispers microparticles in the array.

SUMMARY

According to various embodiments the present disclosure provides porous particles and methods and apparatus for forming porous microparticles. According to a specific embodiment, the present disclosure provides microparticles with multi-nodal porosity and methods for forming the same. According to a still further embodiment, the present disclosure provides microfluidic device-based methods for forming microparticles with multi-nodal nanoporosity. Furthermore, the present disclosure provides populations of monodisperse mesoporous microparticles with multi-nodal nanoporosity and methods and apparatus for forming the same. According to a specific embodiment, the present disclosure provides populations of monodisperse mesoporous microparticles formed using a microfluidic device.

DETAILED DESCRIPTION

Figure 1:
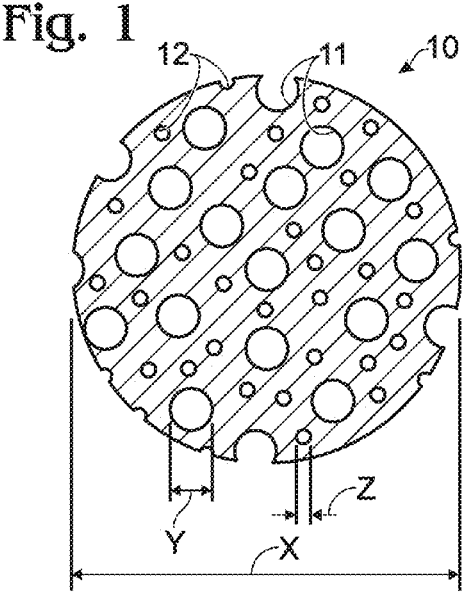
FIG. 1 is a cross-section of a microparticle according to an embodiment of the present disclosure having bimodal porosity.

As stated above, according to various embodiments the present disclosure provides porous particles and methods and apparatus for forming porous microparticles. According to a specific embodiment, the present disclosure provides microparticles with multi-nodal porosity. The multi-nodal porous microparticles of the present disclosure may be formed from a variety of materials including, but not limited to oxides including various forms of silica, silica-like materials, and other metal oxides including, for example niobium oxide. In some embodiments, the methods described herein may be used with organic polymers. According to specific embodiments, the microparticles of the present disclosure may have an average diameter between 3 and 150 micrometers. However, it will be understood that the methodologies described herein may be used to produce particles having substantially smaller or larger diameters. The particles may have any particular shape including both irregular and regular shapes. According to a specific embodiment, the particles are spherical. According to an embodiment, and as shown in cross-section in FIG. 1, the microparticles 10 of the present disclosure have bimodal porosity, by which it is meant that a substantial percentage of the pores in the microparticle conform into two distinct size (i.e diameter)-based populations—a first population 11 having larger diameter pores and a second population 12 having smaller diameter pores. In the drawing, the diameter of the microparticle is shown at x, the diameter of the larger pores is shown at y, and the diameter of the smaller pores is shown at z. For example, a 7 µm diameter spherical microparticle as disclosed herein may include a first population of pores having a diameter in the 1-10 nm range and a second population of pores having a diameter in the 10-100 nm range. While the microparticles may include pores outside of these size ranges, according to an embodiment of the present disclosure, at least 95% of the pores in the microparticle will conform into one of these two diameter-based distributions. According to further embodiments, at least 95% or more of the pores will conform into one of these two diameter-based distributions. In some embodiments, each population of pores may be generally localized to one or more areas of the microparticle.

Figure 20:
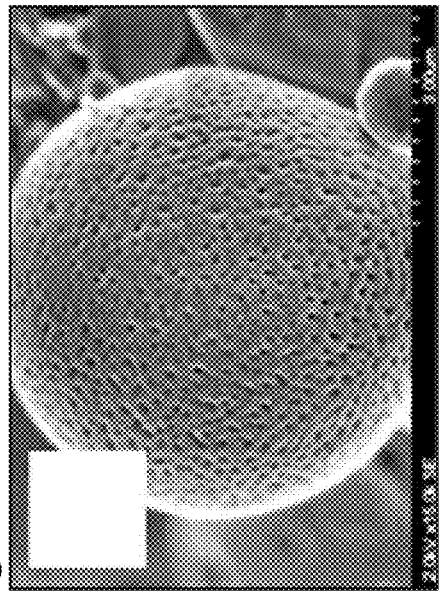
FIG. 20 is an SEM image of a particle formed after adding 0.15 N NaCl.
Figure 23:
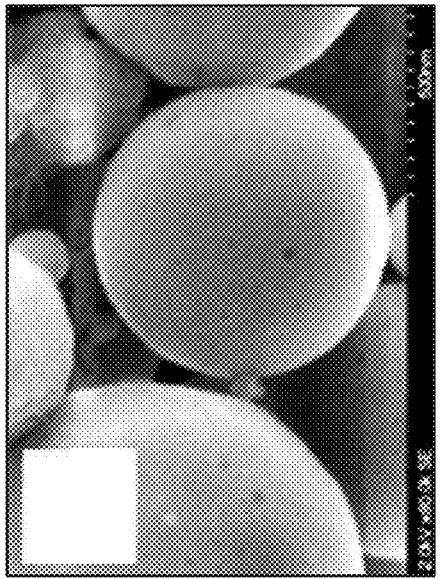
FIG. 23 is an SEM image of a particle formed by increasing the mass of the CTAB surfactant by 25%.
Figure 22:
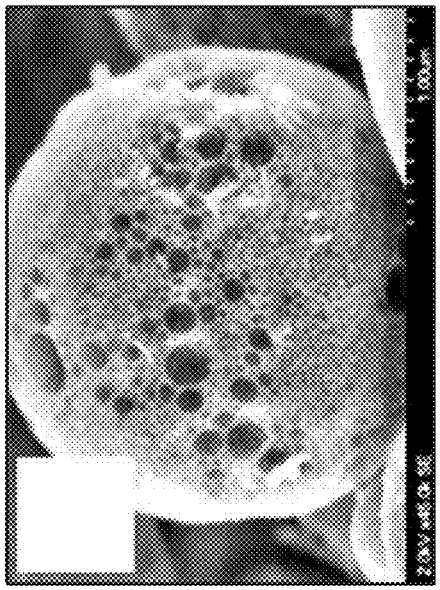
FIG. 22 is an SEM image of a particle formed by reducing the mass of Abil EM90 surfactant by 25%.

According to some embodiments, the microparticles of the present disclosure may be described as having a smooth external surface, an example of which is shown in FIG. 20. Alternatively, the microparticles of the present disclosure may have a rough external surface, as shown, for example, in FIG. 22.

As stated above, according to one embodiment, the present disclosure provides methods for forming porous microparticles. According to a first method, microparticles having a bimodal porous internal structure are formed with one population of pores having dimensions in the tens of nanometers and a second population having smaller pores with dimensions of a few nanometers. According to this method, an aqueous polymer precursor solution/oil mixture is combined with nonionic and cationonic surfactants. The surfactants should be selected such the nonionic surfactant is soluble only in the oil phase and the cationic surfactant is soluble only in the aqueous phase. Furthermore, the two surfactants should significantly decrease the interfacial tension when adsorbed, leading to spontaneous formation of microemulsion droplets. The entire system is then subjected to conditions suitable for formation of large (i.e. micrometer sized) aqueous emulsion drops containing the cationic surfactant dispersed in the oil phase as well as spontaneous formation of microemulsion oil droplets at the larger aqueous drop interface, which then occupy the internal volume. The large aqueous emulsion drops are stabilized by the oil soluble nonionic surfactant. The smaller microemulsion oil droplets are a result of the adsorption of the two surfactants at the oil-water interface and a synergistic drop in the interfacial tension, which facilitates the microemulsion formation. The cationic surfactant should be selected to be above the critical micellization concentration, so that the aqueous phase will also contain micelles. After the droplets and micelles are formed, they are subjected to solvent removal and polymerization, which fossilizes the microemulsion and micellar structures, producing a bimodal porous network within the microparticles. As the solvent is removed, the micelles may undergo further structural changes and form hexagonal structures.

According to one embodiment, the droplets and micelles are formed simply by combining the polymer precursor, oil, and surfactants and stirring them. This method will produce a polydisperse population of microparticles having a bimodal pore size distribution. Should a monodisperse population of microparticles be desired, one could select for particles conforming to the desired size-range using known methodologies.

Alternatively, according to another embodiment of the present disclosure, a microfluidics-based methodology as described below could be employed to produce a monodisperse population of microparticles, eliminating the need to select for microparticles of a desired size. Furthermore, the methodology described herein can be altered to produce microparticles having a predetermined diameter.

Figure 2:
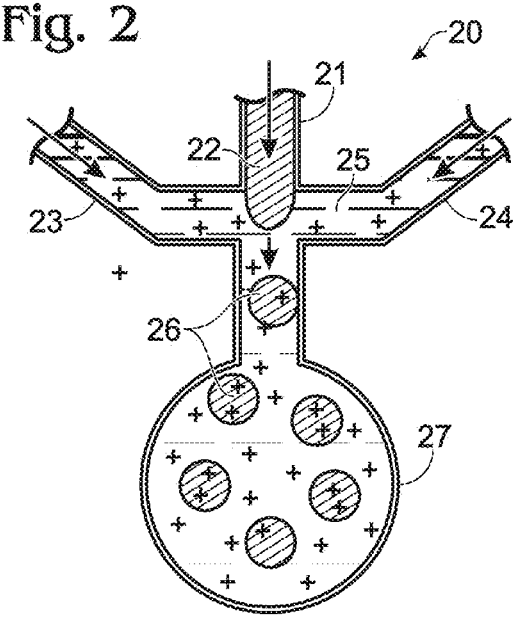
FIG. 2 is schematic illustration of a T-shaped microfluidic device according to an embodiment of the present disclosure which can be used to produce a population of monodisperse droplets.

The formation of monodisperse populations of microparticles using microfluidic devices is known. Typically, particles are formed using a T-shaped microfluidic device, as shown in FIG. 2, wherein device 20 includes a main channel 21, which delivers an aqueous polymer precursor 22 and channels 23 and 24, which deliver an oil and surfactant mixture 25 to channel 21. Droplets 26 are formed at the intersection of channels 21, 22, and 23, where the water and oil phases meet, and are collected in reservoir 27.

Figure 3:
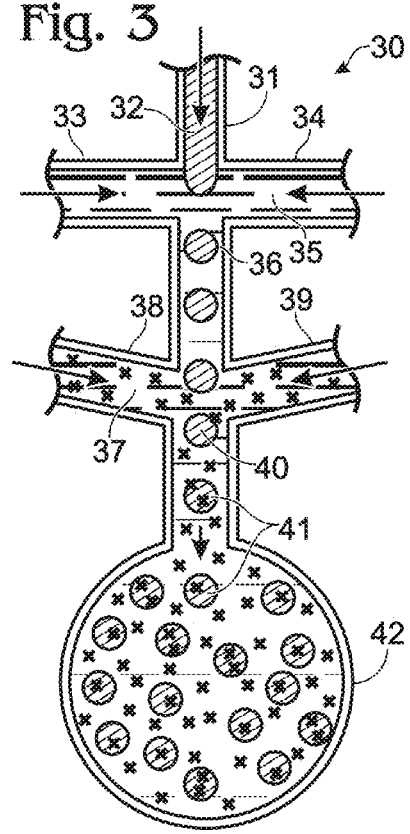
FIG. 3 is a schematic illustration of a multi-stage microfluidic device according to an embodiment of the present disclosure which can be used to produce monodisperse droplets able to produce monodisperse microparticles having bimodal pores.

However, the method for producing microparticles having bimodal pores cannot be used with a T-shaped microfluidic device as shown in FIG. 2 because the surfactants that are required so not produce sufficient interfacial tension to allow for droplet formation. Accordingly, a novel design for the microfluidic device was required. Turning now to FIG. 3, a multi-stage microfluidic device 30 is shown. As shown, device 30 includes main channel 31, which delivers the aqueous polymer precursor 32, channels 33 and 34, which deliver oil 35 to the main channel, allowing the polymer precursor to form droplets 36. The droplets travel through the main channel and encounter an oil and surfactant mixture 37 which is delivered vial channels 38 and 39. The introduction of the oil and surfactant mixture enables the microemulsion phase to form and penetrate the aqueous silica precursor droplets, as shown at 40, the resulting droplets 41 are collected in reservoir 42, before employing evaporative induced self-assembly (ESIA) or other known methods of solvent removal and polymerization, in order to produce microparticles.

It will be appreciated that the presently described method and microfluidic device can be used to produce monodisperse droplet populations, which can then produce particles with or without single or bi-modal pores, depending on the specific surfactants selected. Accordingly, using nonionic and cationonic surfactants, wherein the nonionic surfactant is soluble only in the oil phase and the cationic surfactant is soluble only in the aqueous phase will result in a monodisperse population of microspheres having a bimodal pore distribution. Furthermore, because there is a known relationship between the size of the channel and the resulting size of the droplets and particles, by altering the size (i.e. diameter) of main channel 21, one can easily produce droplets, and therefore particles, of any desired size.

It will be appreciated that the particles of the present disclosure may be useful for a variety of application including, for example, ordering of monodisperse microspheres into 2 and 3 dimensional arrays. Furthermore, the microspheres of the present disclosure may serve as carriers or delivery vehicles for a wide variety of applications including, but not limited to, loading with platinum or other metals for use as fuel cell catalysts (see, e.g., S. Pylypenko et al., Templated Platinum/Carbon Oxygen Reduction Fuel Cell Electrocatalysts, *J. Phys. Chem. C,* 114 (2010) p. 4200, which is hereby incorporated by reference), loading with biologically active materials for use as drug carriers/delivery devices (see, e.g., "Ashley et al., Nature Materials Vol., 10, May 2011, which is hereby incorporated by reference and which demonstrates the use of particles formed using the techniques described herein as lipid bilayer supports for use in targeted drug delivery); separation and chromatography; biosensors; optical coatings; catalysts; catalyst supports; etc.

Furthermore, it should be noted that the processing conditions described herein for the surfactant templating are very different from those used in previously described aerosol methods. Specifically, the kinetics of solvent evaporation in the herein disclosed methods are much slower because the solvents (water and alcohol) are transported across the continuous hexadecane phase. This means that the surfactant has a longer time to self-assemble into micellar structures that are closer to equilibrium. In the aerosol method, the solvent removal is very quick, and some of the structures can be kinetically trapped. Thus, the slower kinetics lead to better control of the pore structure and size. It also allows the study of the surfactant self-assembly process in silica, which is not tractable when solvent evaporation is too fast. Solvent evaporation and removal across the continuous organic (hexadecane) phase can also be used to obtain other mesoporous structures such as films and membranes. These structures do not require the use of microfluidics but may benefit from the slower kinetics.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

REFERENCES

Carroll, N. J., et al., Droplet-based microfluidics for emulsion and solvent evaporation synthesis of monodisperse mesoporous silica microspheres. Langmuir, 2008. 24(3): p. 658-661.

Carroll, N. J., Pylypenko, P., Atanassov, P. B., and Petsev, D. N., Microparticles with Bimodal Nanoporosity Derived by Microemulsion Templating. Langmuir, 2009.

Aveyard, R., et al., Interfacial-Tension Minima in Oil-Water Surfactant Systems—Behavior of Alkane Aqueous Nacl Systems Containing Aerosol Ot. Journal of the Chemical Society-Faraday Transactions I, 1986. 82: p. 125-142.

Aveyard, R., B. P. Binks, and J. Mead, Interfacial-Tension Minima in Oil+Water+Surfactant Systems—Effects of Salt, Temperature and Alkane in Systems Containing Ionic Surfactants. Journal of the Chemical Society-Faraday Transactions I, 1985. 81: p. 2169-2177.

Schmidt-Winkel, P., C. J. Glinka, and G. D. Stucky, Microemulsion templates for mesoporous silica. Langmuir, 2000. 16(2): p. 356-361.

Rao, G. V. R., et al., Monodisperse mesoporous silica microspheres formed by evaporation-induced self assembly of surfactant templates in aerosols. Advanced Materials, 2002. 14(18): p. 1301-1304.

EXAMPLES

Example I

Synthesis of Monodisperse Silica Microparticles Using Microfluidic Device

A silica precursor solution was prepared by hydrolyzing 5.2 g of tetraethylorthosilicate (TEOS, Purum >98%) in 3 g of ethanol (99.7%) and 2.7 g of 0.01 N hydrochloric acid (pH 2) under vigorous stirring at room temperature for 30 min. Next, 1.4 g of the amphiphilic triblock copolymer templating molecule (Pluronic, BASF, P104) was dissolved in 5.43 g of DI water and subsequently mixed with the hydrolyzed TEOS solution to complete the preparation of the aqueous-based sol. We designed this particular recipe to allow the use of Pluronic surfactant as a templating reagent in the presence of a much lower concentration of ethanol than used by other authors [17]. Emulsification of the aqueous siliceous precursor was achieved by supplying the sol-dispersed phase and organic oil continuous phase to the microfluidic device using two digitally controlled Harvard Pico Plus syringe pumps. The droplet (and therefore particle) production was approximately 100/s. The continuous phase was prepared by dissolving ABIL EM 90 (Degussa) surfactant in hexadecane (3 wt %), which served as an emulsion stabilizer. The volumetric flow rate for the dispersed sol was optimized to 0.5 µL/min, with a flow rate of 3.5 µL/min for the continuous oil phase. The SU-8 photoresist-templated poly(dimethylsiloxane) (PDMS) microfluidic device was fabricated using a well-established softlithography method. The microfluidic device used in this study is shown in FIG. 1. The MFFD-produced droplets were transferred to a 50 mL round bottomed flask and heated to 80° C. under a reduced pressure of 70 mTorr for 2 h. The flask was pretreated with RAIN-X solution to make it hydrophobic. This was necessary to prevent the droplets from sticking to the flask bottom. To prevent droplet flocculation and coalescence before the sol-gel transition was complete, the emulsion was subjected to constant stifling at 200 rpm. This stirring was sufficient to keep the droplets suspended and separated, and did not lead to shear deformation. The particles were then collected and centrifuged, followed by calcination in air at 500° C. for 5 h to remove the templating surfactant.

Figure 4:
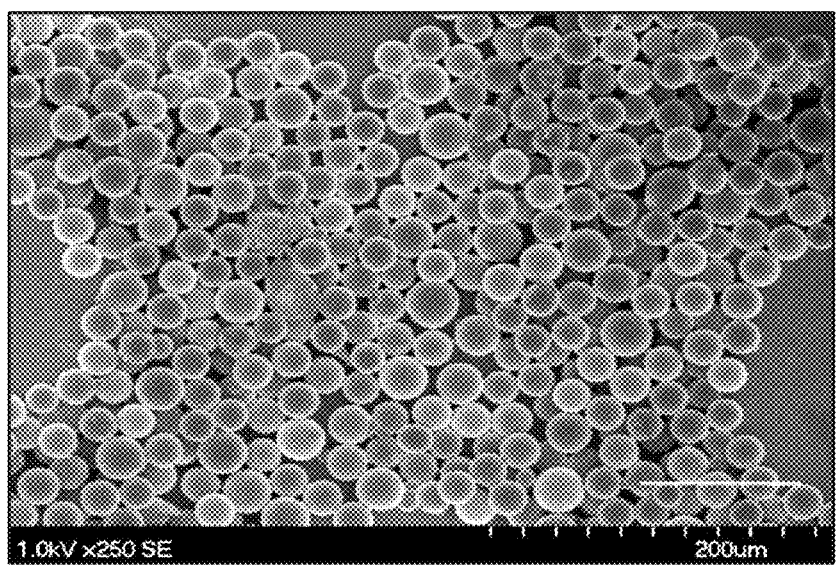
FIG. 4 is an SEM image of monodisperse microparticles templated by monodisperse microfluidic device-generated droplets, as described in Example 1.
Figure 5:
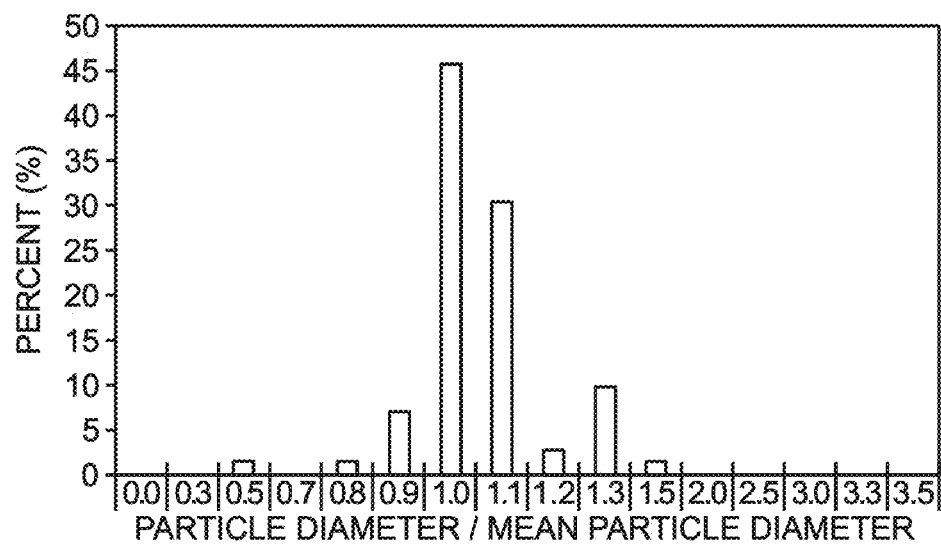
FIG. 5 is a graph showing the size distribution of the population of microparticles formed in Example 1.

FIG. 4 shows polydisperse particles obtained from TEOS precursor droplets formed in hexadecane oil. The scale bar is 100 µm. The hexadecane allows for the solvent (DI water and ethanol) to be expelled from the droplets, which leads to polymerization of the templated silica. Using a microfluidic device similar to the one shown in FIG. 2, we were able to form monodisperse droplets, which is the necessary condition for obtaining well-defined monodisperse particles. The MFFD used can produce droplets between 25 and 75 µm and particles of about half that size. The particle size distribution in FIG. 5 exhibits one well-defined peak centered at around 23 µm. Particles like these are obtained from droplets that were initially between 35 and 40 µm in diameter. After the solvent (water and ethanol) is expelled, the final size is the one shown in FIG. 4. There is a second peak at 30 µm that is most likely due to some coalescence that occurred before the droplets converted to silica particles. The size of the droplets depends on the dimensions of the microchannel, the flow rates in the central and side channels, the viscosity of the fluids (water/ethanol and oil), and the surfactant. Hence, a single device can produce monodisperse droplets of different sizes by varying the relative magnitude of the viscous and interfacial forces that are involved. We were able to vary the droplet size by 1 to 3 times the channel width. Hence, to cover a wider range of sizes one may need more than one microfluidic device or may have several channels, each with different sizes, fabricated on the same device. The evaporation of the solvent necessary to form the solid mesoporous silica spheres leads to an overall size reduction. Therefore, the final particles are approximately half the size of the original droplets.

Figure 6:
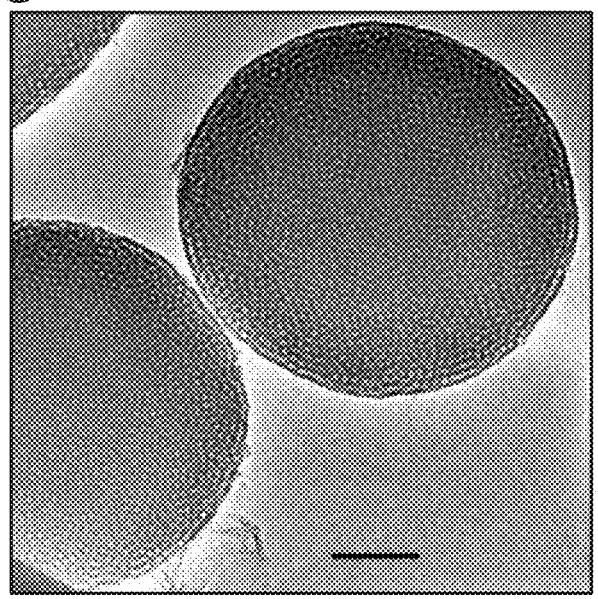
FIG. 6 is a transmission electron microscope image of the silica microspheres of Example 1 containing mesostructured pores that are well ordered by the P104 surfactant.

FIG. 6 shows a transmission electron microscope image of silica particles with internally ordered mesoporous structure. The scale bar is 100 nm. The particles were selected from the lower end of the distribution curve in FIG. 5. This allowed us to get a better image of the internal mesoporous structure. The pores have an approximately uniform size, which for the surfactant that we used is 6.4 nm, and a pore volume of 0.56 cm3/g. The pores seem to be closed at the surface, which is also the case reported by other authors.

Example II

Synthesis of Polydisperse Silica Microparticles with Bimodal Porosity

A silica precursor solution was prepared by dissolving 1.82 g of cetyltrimethylammonium bromide (CTAB) in 20 g of DI water under vigorous stirring at 40° C. until the solution was clear. Next, 5.2 g of TEOS (Purum>98%) and 0.57 g of 1 N hydrochloric acid were added to the mixture under vigorous stirring at room temperature for 30 min to hydrolyze and dissolve the TEOS monomer. The measured acidity of the hydrolyzed sol showed pH≈2. The oil phase was prepared by dissolving a modified polyetherpolysiloxane/dimethicone copolyol surfactant with the trade name ABIL EM 90 (Degussa) in hexadecane (3 wt %). The aqueous siliceous precursor solution was then added to the oil phase and subsequently emulsified by brisk shaking of the vial. The emulsion was transferred to a 1000 mL round-bottom flask and heated to 80° C. under a reduced pressure of 70 mTorr for 3 h. The particles were collected and centrifuged, and the supernatant oil removed, followed by calcination in air at 500° C. for 5 h to remove the templating surfactant.

Figure 7:
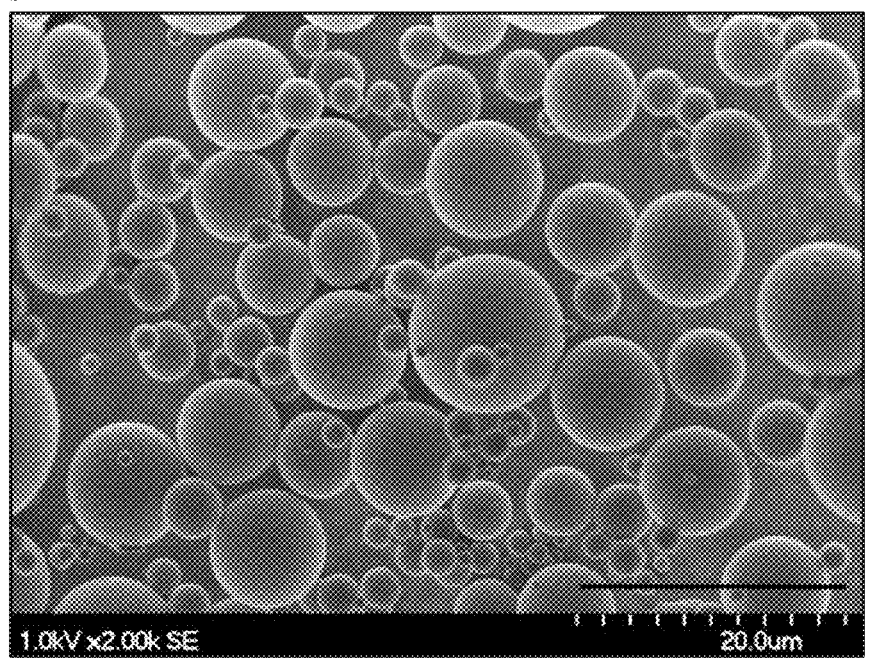
FIG. 7 is an SEM image of polydisperse microparticles having bimodal porosity, templated from a shaken bulk emulsion, as described in Example 2.
Figure 8:
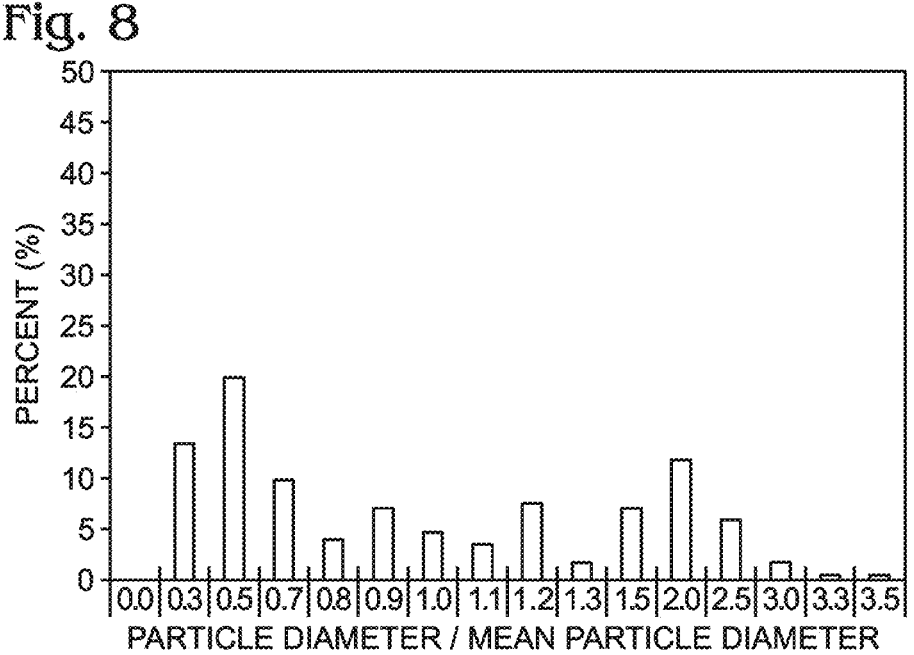
FIG. 8 is a graph showing the size distribution of the population of microparticles formed in Example 2.

FIG. 7 is an SEM image of the polydisperse particles obtained from a bulk emulsion. The scale bar is 20 µm. The particles have a well-defined spherical shape but are very polydisperse. It is not possible to improve on this because a shaken emulsion produces polydisperse droplets, which later result in a wide particle size distribution. The size distribution, as shown in the histogram of FIG. 8, is broad and includes a wide range of particles, which is also evident from the image.

Dynamic light scattering (DLS) studies were conducted on a Nanotrac NPA250 dynamic light scattering instrument from Microtrac Inc. The measurements were separately performed in the two macroscopic phases (aqueous solution of the CTAB and silica precursor that has been in contact with the oil containing the ABILEM90). After waiting for 48 h, the oil phase spontaneously dispersed into the water in the absence of any additional stirring. The X-ray powder diffraction (XRD) patterns were obtained on a Scintag diffractometer (Cu KR radiation). Transmission electron microscopy (TEM) was conducted on JEOL 2010 and 2010F instruments, and scanning electron microscopy (SEM) was done on a Hitachi S-800 instrument. Nitrogen (77.4) adsorption/desorption measurements were performed on a Quantochrome Autosorb-I-MP instrument. Prior to analysis, the sample was outgassed overnight at 120° C. The adsorption data were analyzed using an NLDFT approach and cylindrical pore model.

Figure 9:
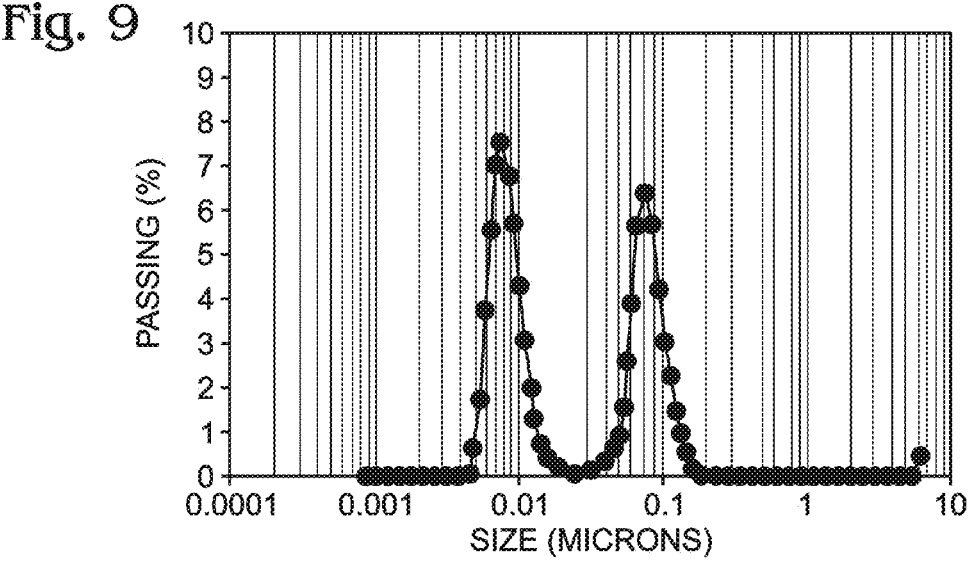
FIG. 9 is a graph showing the bimodal distribution of the pores in the microparticles formed using the techniques in Example 2.

The DLS results are shown in FIG. 9 where two well-defined peaks are present. The left peak represents the CTAB micelles, while the right peak is due to the microemulsion droplets. DLS measurements of the oil phase showed a single peak with maximum at ~30 nm and a long tail toward larger sizes.

Figure 10:
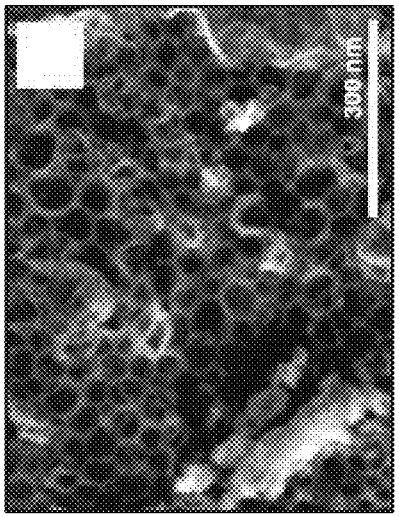
FIG. 10 is an SEM image showing the honeycombed surface of the particles formed in Example 2.
Figure 12:
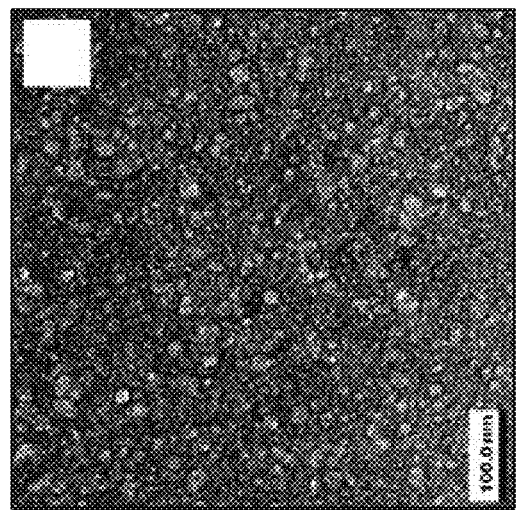
FIG. 12 is a TEM image of a silica particle formed using the techniques described in Example 2 showing open access to the internal pore network.
Figure 11:
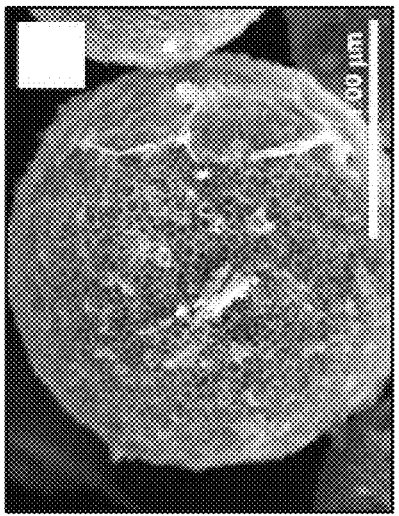
FIG. 11 is a close-up SEM image of the honeycombed surface of a particle formed using the techniques described in Example 2.
Figure 13:
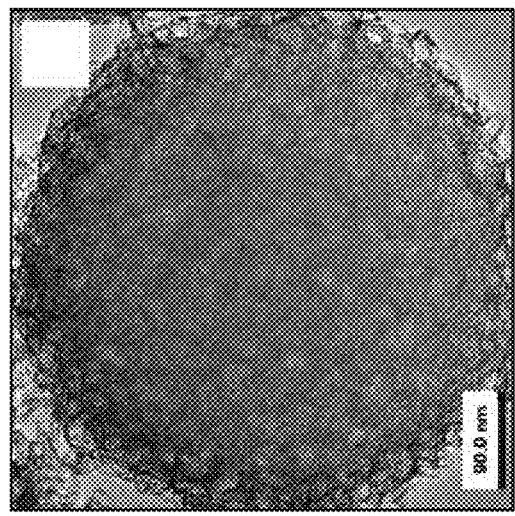
FIG. 13 is a cross section of a silica particle formed using the techniques described in Example 2 showing microemulsion-templated pores (10-30 nm in diameter) along with smaller, micelle-templated pores (~5 nm in diameter.)
Figure 14:
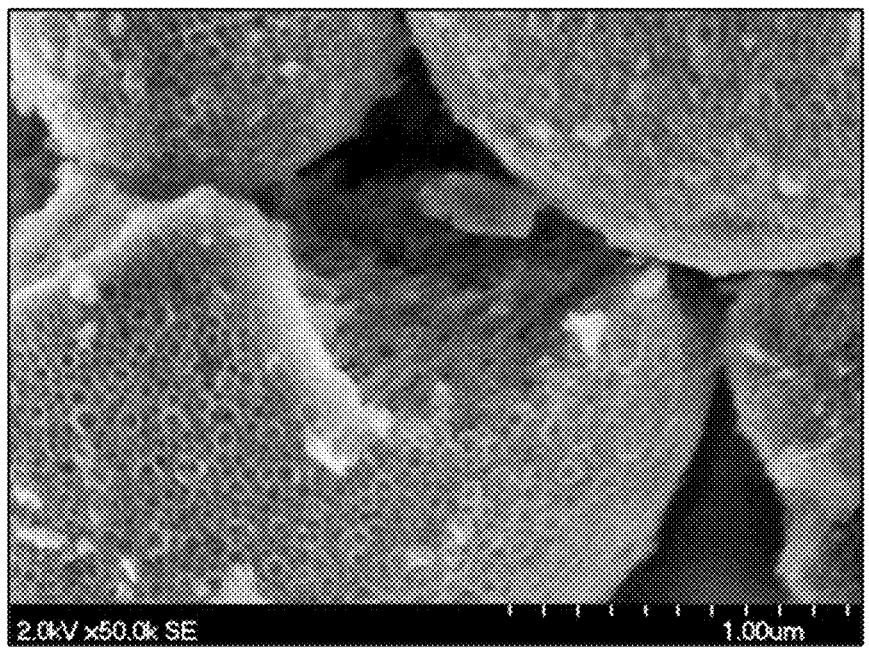
FIG. 14 is an SEM image of a particle formed using the techniques described in Example 2 showing the presence of large pores throughout the particle.
Figure 15:
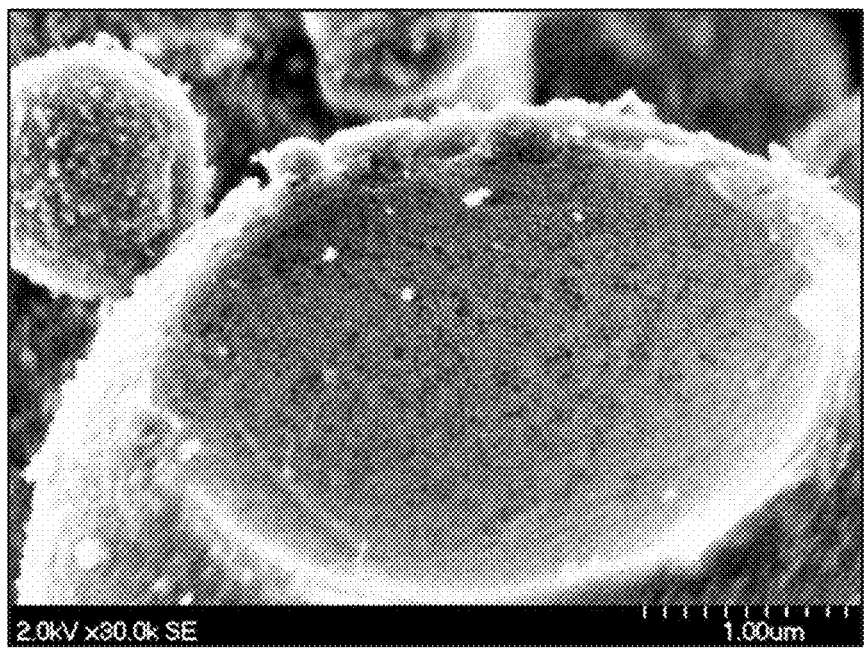
FIG. 15 is another SEM image of a particle formed using the techniques described in Example 2 showing the presence of large pores throughout the particle.
Figure 16:
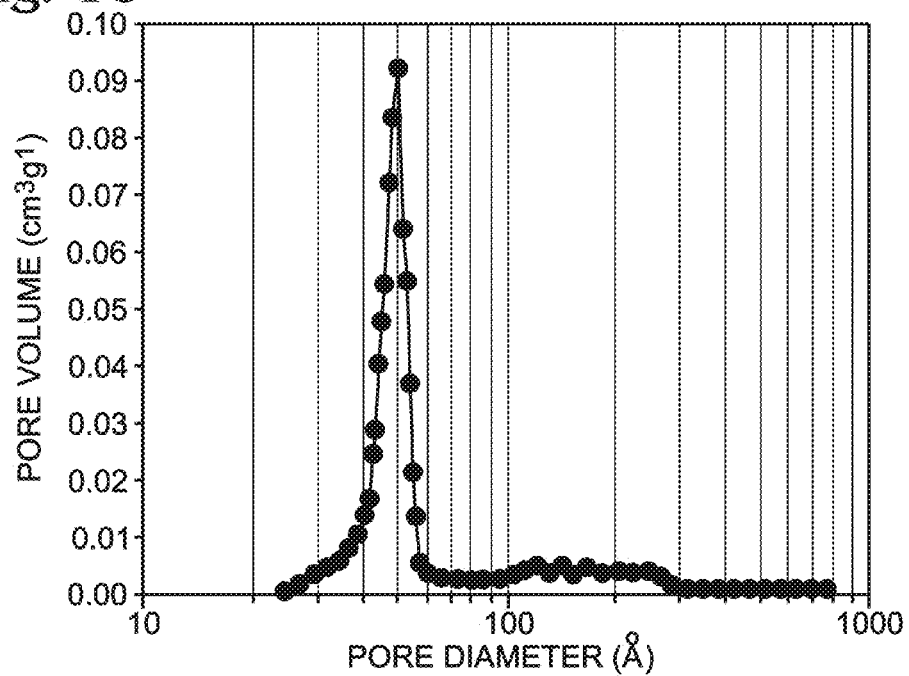
FIG. 16 is an NLDFT analysis of nitrogen adsorption isotherm suggesting a bimodal pore distribution in microparticles formed using the techniques described in Example 2.

The obtained silica particles exhibit a honeycomb-like structure observed by scanning electron microscopy (SEM) (FIGS. 10 and 11), which shows the presence of cavities at the surface with diameters of about 40 nm. A transmission electron microscopy (TEM) micrograph of the particles indicates open access to the porous network (FIG. 12), which facilitates impregnation of the interior with replica materials. Open access to the pores is often not the case if only small surfactant micelles are templated. The TEM image of a particle cross section in FIG. 13 and the SEM image of a fractured particle in FIGS. 14 and 15 confirm the presence of the large pores in the interior. The pore size analysis (FIG. 16) suggests the presence of larger (~10-30 nm) and smaller (~5 nm) pores. The cavities at the particle surfaces (observed by SEM) are larger than the pores in the interior of the particle. The obtained silica microspheres have a Brunauer-Emmett-Teller (BET) surface area and pore volume of ~1000 m2/g and 1.098 cc/g, respectively. Most of the surface area is attributed to the presence of the smaller pores.

Figure 17:
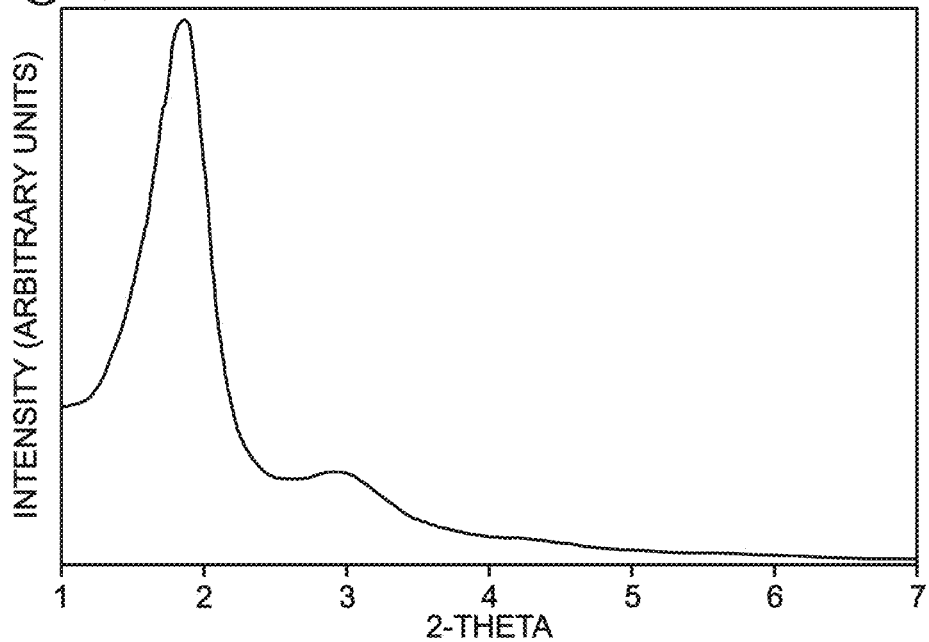
FIG. 17 in an XRD pattern verifying the existence of hexagonally packed, micelle-templated pores in microparticles formed using the techniques described in Example 2.

The smaller pores are not visible in the SEM images (FIGS. 11, 14, and 15); however, they are detectable by TEM (FIG. 14), adsorption measurements (FIG. 16), and powder X-ray diffraction (XRD) (FIG. 17). They are due to templating of CTAB micelles that are present in the aqueous phase (see the first peak in FIG. 9).

Figure 19:
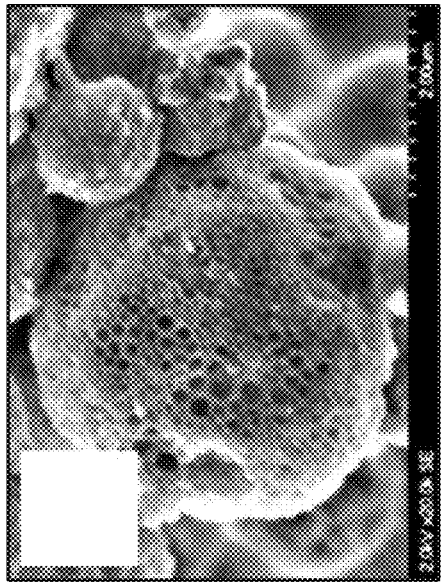
FIG. 19 is an SEM image of a particle formed after adding 0.075 M NaCl.
Figure 21:
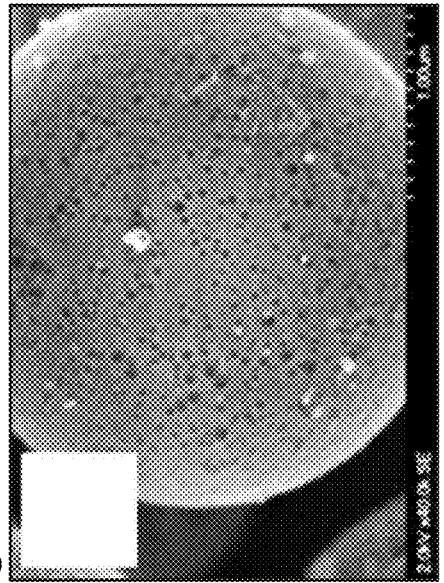
FIG. 21 is an SEM image of a particle formed using a 2:1 oil to water ratio.
Figure 18:
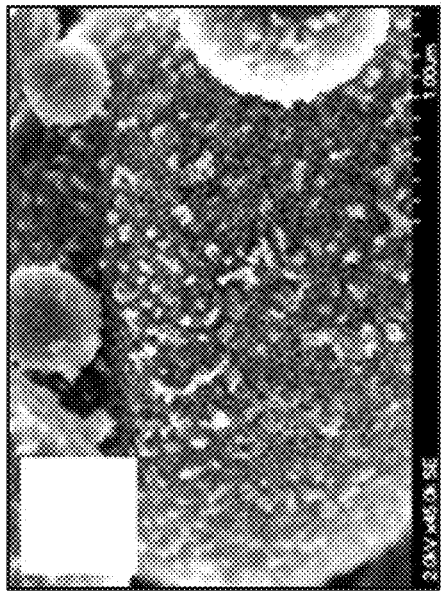
FIG. 18 is an SEM image of a particle formed using a standard microemulsion mixture.

It has been determined that slight variations in microemulsion mixture components (electrolyte concentration, wt % of surfactants, oil to sol ratio, etc.) can produce strikingly different pore morphologies and particle surface areas (see for example, FIGS. 18-23). In FIG. 18, particles were formed using the standard microemulsion mixture, producing pores with a BET surface area of 1000 m²/g. As shown in FIG. 19, the addition of 0.075M NaCl resulted in a BET surface area of 650 m²/g. As shown in FIG. 20, the addition of 0.15 M NaCl resulted in a BET surface area of 850 m²/g. The particle in FIG. 21 is the product to a 2:1 oil to water ratio, which produced a BET surface area of 1038 m²/g. The particle in FIG. 22 resulted from reducing the mass of Abil EM90 surfactant by 25%, which produced a BET surface area of 975 m²/g. The particles shown in FIG. 23 resulted from increasing the mass of CTAB surfactant by 25%, which resulted in a BET surface area of 1250 m²/g.

Example III

Synthesis of Monodisperse Microparticles Having Bimodal Porosity Using a Multi-Stage Microfluidic Device The aqueous silica precursor solution was prepared by dissolving 0.455 g of CTAB in 5 g of deionized water with stirring at 40° C. for 15 minutes. 0.14 g of HCl and 1.3 g of TEOS was added to the solution and was hydrolyzed at room temperature for one hour under vigorous stirring. The continuous phase was prepared by dissolving ABIL EM 90 (Degussa) surfactant in hexadecane (2 wt %). The low interfacial tension necessary for the formation of a microemulsion within the aqueous silica precursor phase makes integration of microdroplet formation within a microfluidic device problematic. This is demonstrated by the characteristic time (r) to reach capillary instability:

$$\tau \approx \frac{\mu r}{\gamma}$$

where μ is fluid stream viscosity. Thus as interfacial tension (γ) approaches zero, the time for thread instability and breakage within the microfluidic orifice approaches infinity. To circumvent this problem, a multi-stage microfluidic device as shown in FIG. 3 was used. Using this device, the aqueous silica precursor is emulsified in a 10 μm-diameter orifice with pure hexadecane oil. The droplets travel downstream with oil between them to prevent interaction and coalescence. Next, hexadecane with 2 wt % Abil EM90 surfactant is added allowing the microemulsion phase to form and penetrate the aqueous silica precursor droplets. The droplets are collected in a large (6 mm diameter) reservoir where the solvent is evaporated out of the silica precursor drops at ambient temperature and pressure to induce gelation and surfactant self assembly.

In our previous microemulsion-templated silica particle synthesis experiments, emulsion evaporation was carried out at an elevated temperature of 80° C. under vacuum pressure. Vigorous bubbling was observed during the evaporation process. It was necessary to avoid vigorous bubbling of the emulsion during the processing of monodisperse silica precursor droplets as this led to shearing of the droplets prior to gelation and thus a disruption of the narrow size distribution. The issue of droplet disruption during evaporation was further exacerbated by the low interfacial tension of the system, in which droplets are easily deformable due to low interfacial tension and small Laplace pressure (ΔPL):

$$\Delta P_L = \frac{2\gamma}{r},$$

where r is the spherical droplet radius and γ is the interfacial tension. Orifice diameter is the primary parameter in determining the size of droplets formed in the microfluidic device. To maximize ΔPL, we form droplets in the smallest orifice diameter possible (10 μm), limited by the resolution of the printer used to produce the soft lithography photo masks.

Emulsion evaporation was carried out at room temperature to avoid vigorous bubbling and droplet disruption. Aranberri and coworkers determined that emulsion droplet evaporation occurs via a mechanism where the droplets remain separated from the vapor phase by a liquid continuous phase and transport from the droplets to the vapor occurs by diffusion of dissolved molecules through the surrounding continuous phase. It was determined a factor f, with values between 0 and 1 represents the factor by which the rate of evaporation of emulsion droplets is reduced below that for the pure fluid, and correlates with the solubility of the fluid in the continuous phase. The flux J across the continuous phase is related to the linear concentration gradient:

$$J = D_W \frac{S - fS}{d},$$

where Dw is the diffusion coefficient of droplet solvent in the continuous phase, S is the equilibrium solubility of the droplet fluid and the concentration at the droplet surface, fS is the concentration of droplet solvent at the continuous phase/vapor interface, and d is the thickness of the continuous phase. To increase flux of the droplet solvent, most of the hexadecane oil phase was pipetted and removed from the reservoir until only a thin film remained above the gravity-settled aqueous silica precursor droplets.

Figure 24:
FIG. 24 shows aqueous silica precursor droplets in the hexadecane oil phase, as described in Example 3. The scale bar is 20 μm.

FIG. 24 shows the silica precursor droplets as imaged in the collection reservoir. Opaqueness formed in the continuous phase near the droplets. The scale bar is 20 μm.

Figure 25:
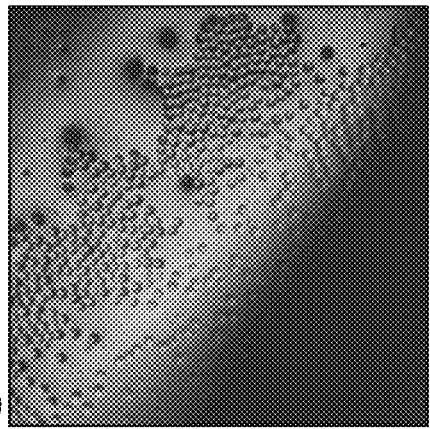
FIG. 25 shows silica particles in the hexadecane oil phase after evaporative processing, as described in Example 3. The scale bar is 15 μm.

FIG. 25 shows the processed silica particles in hexadecane within the collection reservoir following evaporative processing. Particle diameter is ~7 μm; the particles are smaller than the precursor drops (10 μm diameter) due to loss of solvent during evaporative processing.

Figure 26A:
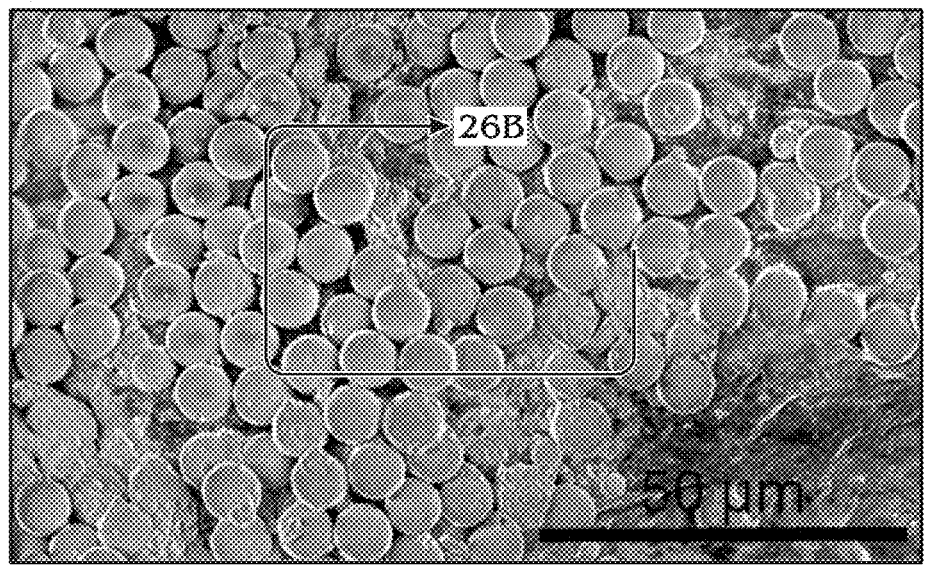
FIG. 26A shows SEM images of monodisperse silica particles formed using the techniques and device of Example 3.
Figure 26B:
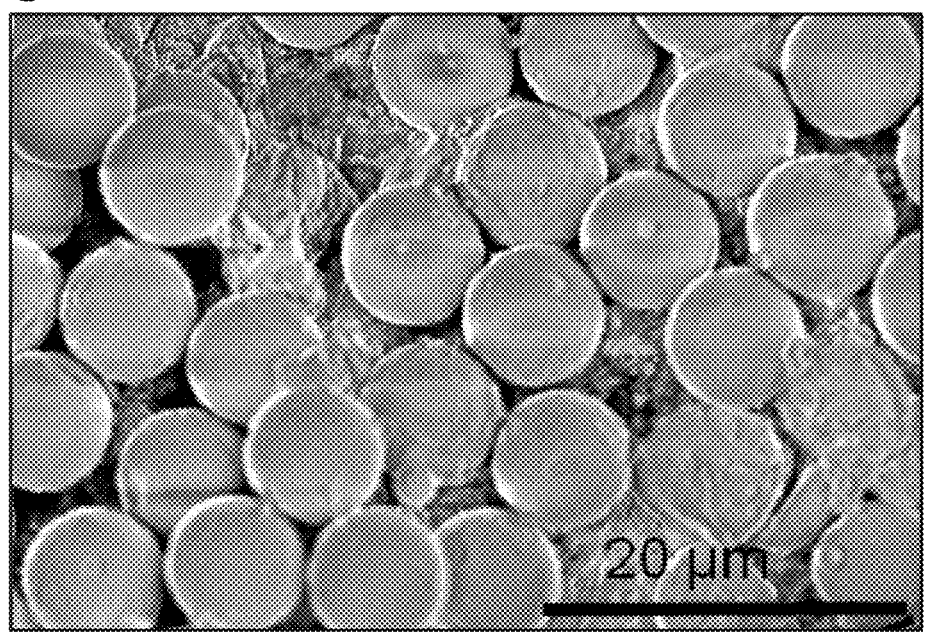
FIG. 26B shows a closeup image of a portion of FIG. 26A
Figure 27:
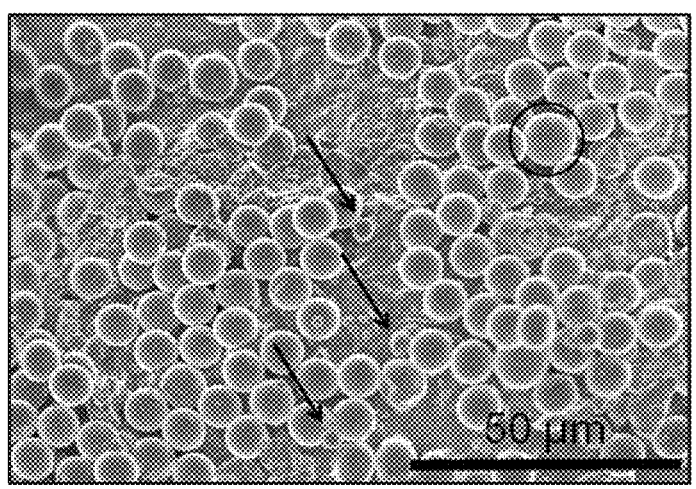
FIG. 27 is a SEM micrograph showing the existence of smaller particles due to satellite droplet formation (arrows) and large particles due to droplet coalescence (circle) using the device and techniques of Example 3.

Following washing of the particles with hexane and drying, the particles are imaged via SEM (FIGS. 26A and 26B). Smaller (1-2 μm diameter) particles are observed throughout the sample (arrows FIG. 27). These smaller particles are attributed to the formation of satellite drops during emulsification in the microfluidic orifice. Some larger particles were observed in the sample, most likely due to coalescence of droplets (circled particle, FIG. 27). It will be understood that while the population includes these slightly larger and smaller particles, because greater than 90% of the particles have a diameter range within 1-2% of their average diameter, the population would still be considered monodisperse.

Figure 28:
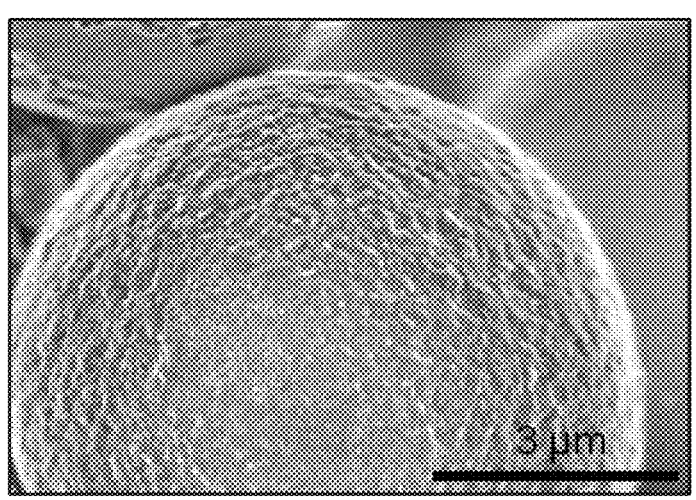
FIG. 28 is an SEM micrograph showing the surface morphology of microemulsion templated particles using the techniques device of Example 3.
Figure 29:
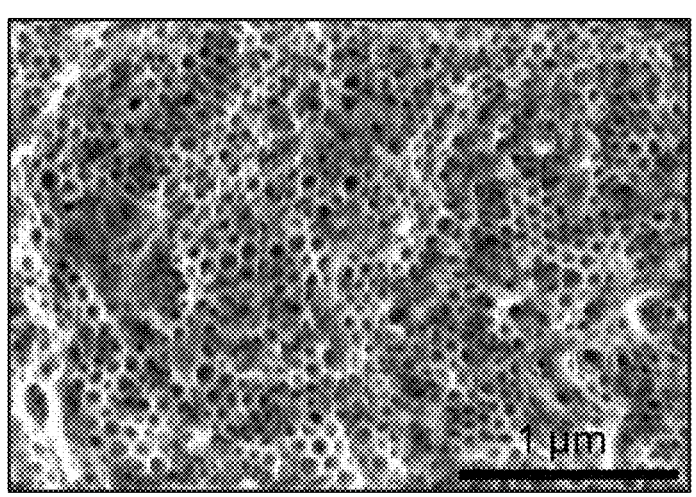
FIG. 29 is another SEM micrograph showing the surface morphology of microemulsion templated particles using the techniques device of Example 3.

The obtained silica particles exhibit a honeycomb-like structure observed by scanning electron microscopy (SEM) (FIGS. 28 and 29), which shows the presence of cavities at the surface with diameters about 40 nm. This is in excellent agreement with the surface morphology observed in the original microemulsion-templated silica particle synthesis from a bulk emulsion system.

What is claimed is:

1. A method for forming a monodisperse spherical mesoporous microparticles comprising:
    providing a microfluidic device comprising:
        a main channel;
        a first channel fluidly connected to the main channel, and
        a second channel fluidly connected to the main channel downstream of the first channel;
    delivering a mixture of a polymer precursor and a cationic surfactant though the main channel of the microfluidic device;
    delivering oil via the first channel to form emulsion droplets;
    delivering an oil and nonionic surfactant mixture via the second channel to form a microemulsion phase that penetrates the emulsion droplets;
    removing the solvents and allowing polymerization of the polymer precursor so as to produce a monodisperse population of spherical microparticles having pores formed from templating the microemulsion droplets.

2. The method of claim 1 wherein the polymer precursor is a silica precursor.

3. The method of claim 1 wherein the nonionic surfactant is soluble only in the oil phase.

4. The method of claim 3 wherein the cationic surfactant is dissolved only in the aqueous phase.

5. The method of claim 1 wherein the nonionic surfactant is Abil EM90.

6. The method of claim 1 wherein the cationic surfactant is CTAB.

7. The method of claim 1 wherein the larger diameter pores are between 10 and 40 nm in diameter and the smaller diameter pores are between 3 and 7 nm in diameter.

8. A method of forming a monodisperse population of mesoporous microparticles, the method comprising:
    delivering a solution containing a mixture of a polymer precursor and a cationic surfactant to the main channel of a microfluidic device;
    delivering oil to the main channel under suitable conditions that the polymer precursor solution forms emulsion droplets in the microfluidic device;
    allowing the emulsion droplets to flow through the microfluidic device;
    delivering oil and a nonionic surfactant-to the formed emulsion droplets in the microfluidic device under suitable conditions that the nonionic surfactant is able to permeate the emulsion droplets and form microemulsion oil droplets within the emulsion droplets;
    collecting the microemulsion containing emulsion droplets; and
    removing the solvents, thereby allowing the polymer precursor to polymerize and template the microemulsion oil droplets, thereby forming a monodisperse population of porous microparticles.

9. The method of claim 8 wherein the cationic surfactant is soluble only in the aqueous phase and the nonionic surfactant is soluble only in the oil phase.

10. The method of claim 8 wherein the cationic and nonionic surfactants significantly decrease the interfacial tension when adsorbed.

11. The method of claim 1 wherein removal of the solvents is performed by evaporation at ambient temperature and pressure.

12. The method of claim 1 wherein the emulsion droplets are formed at or near the intersection of the main channel and the first channel.

13. The method of claim 1 wherein the microemulsion phase penetrates the droplets at or near the intersection of the main channel and the second channel.

* * * * *